Figure 1:
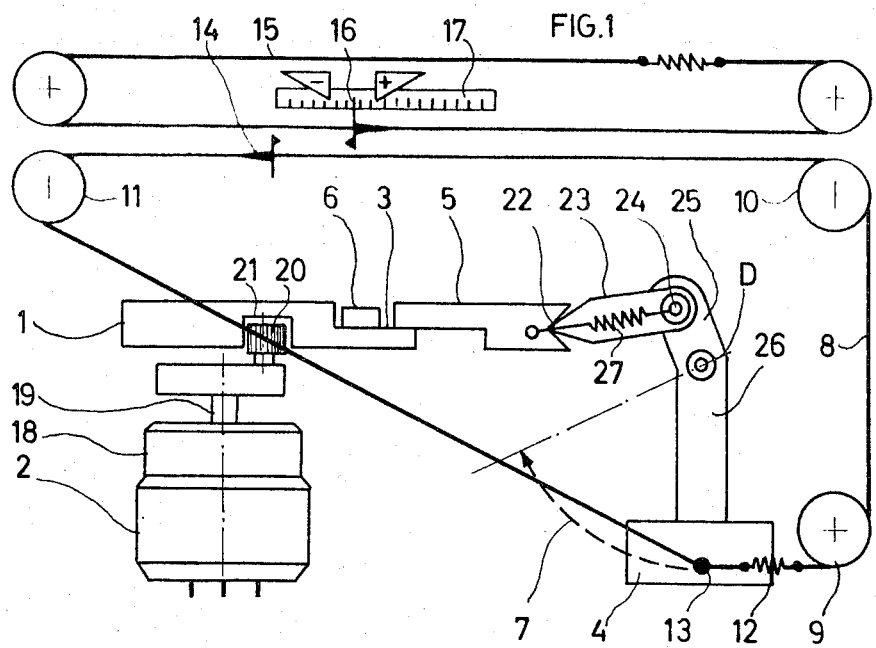

United States Patent [19]
Flury

[11] 3,757,566
[45] Sept. 11, 1973

[54] HARDNESS TESTER FOR TABLETS

[75] Inventor: Karl A. Flury, Dietikon, 8953 Dietikon, Switzerland

[73] Assignee: Heberlein & Co., Wattwil, Switzerland

[22] Filed: Sept. 28, 1971

[21] Appl. No.: 184,450

[30] Foreign Application Priority Data
Oct. 14, 1970  Switzerland...................... 15179/70

[52] U.S. Cl........................................ 73/78, 73/94
[51] Int. Cl. ........................................... G01n 3/08
[58] Field of Search .................... 73/78, 81, 90, 94, 73/95, 95.5, 98

[56] References Cited
UNITED STATES PATENTS
1,408,554  3/1922  Widney.................................. 73/94
2,975,630  3/1961  Michel................................ 73/94 X
2,976,723  3/1961  Eddy........................................ 73/94

FOREIGN PATENTS OR APPLICATIONS
1,168,563  12/1958  France..................................... 73/78
  145,384   4/1960  U.S.S.R.................................. 73/81

Primary Examiner—Jerry W. Myracle
Attorney—Kurt Kelman

[57] ABSTRACT

A hardness tester for tablets comprises a power-driven pressure slide supporting the tablets and a measuring slide mechanically connected to a weight. The slides and the weight constitute a pendulum weight to which a cord is fastened. The cord is trained about guide rolls and carries between two of the rolls an engaging means actuating a drag pointer fastened to a second cord parallel to the first cord. The force acting on the tablet is indicated on a linear scale.

16 Claims, 5 Drawing Figures

Patented Sept. 11, 1973

3,757,566

3 Sheets-Sheet 1

HARDNESS TESTER FOR TABLETS

The present invention concerns a hardness tester for tablets, comprising a pressure slide driven by an electric motor and provided with a tablet support, and further comprising a measuring slide mechanically connected to a weight.

The term "hardness" in pharmaceutical practice means mechanical strength, in particular compressive strength. The compressive strength of a tablet is its resistance to a force acting along the tablet diameter, usually measured in kilograms. The compressive strength specified is the force at which the tablet breaks up. There are various known appliances for the testing of compressive strength, some of them designed for manual operation, others for motor operation. The appliances for manual operaton have the major drawback that the operator requires a certain practice in order to achieve uniform and reproducible measuring results. Moreover, the measuring results obtained by different operators may vary considerably. Motor-driven versions generally give appreciably more uniform measuring results.

However, the known appliances of the motor-driven type also present certain major drawbacks. First, their construction is usually complicated, making them very expensive. Then, the safeguards for the operator are inadequate. Also, the safeguards protecting the appliance itself are inadequate, so that on failure of a limit switch, for instance, the appliance runs with great force against a mechanical stop. This may result in considerable mechanical damage. Moreover, the readability of the value measured is inadequate. Not only is the line of sight inconvenient to the operator, but the generally used dial scales are not easy for the unpracticed to interpret. Again, the known appliances of the type do not permit limit value decisions of the good-or-poor type to be made. Finally, the internal friction of the indicating system, especially for smaller pressures, is irregular, affecting the accuracy of the indication.

The object of the present invention is to provide a system which is free of the drawbacks mentioned and in particular ensures high dependability and also high operator safety, and which further ensures easy and reliable readability. This object is achieved for an appliance of the type mentioned in that the slides and the weight form a pendulum weight to which is fastened a cord which is looped back around guide rolls to the pendulum weight, and that the cord carries, between two guide rolls, an engaging means which actuates a drag pointer fastened to a second cord which is parallel to the first cord at least in the engaging zone, the arrangement being such that the force acting on a tablet is indicated on a linear scale.

Figure 2:
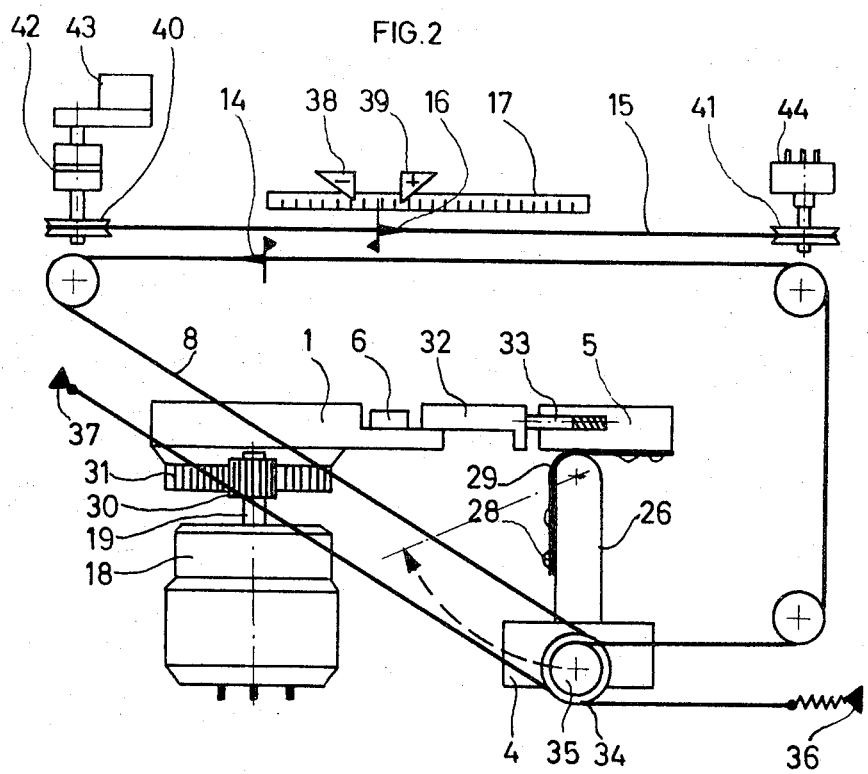
Figure 3:
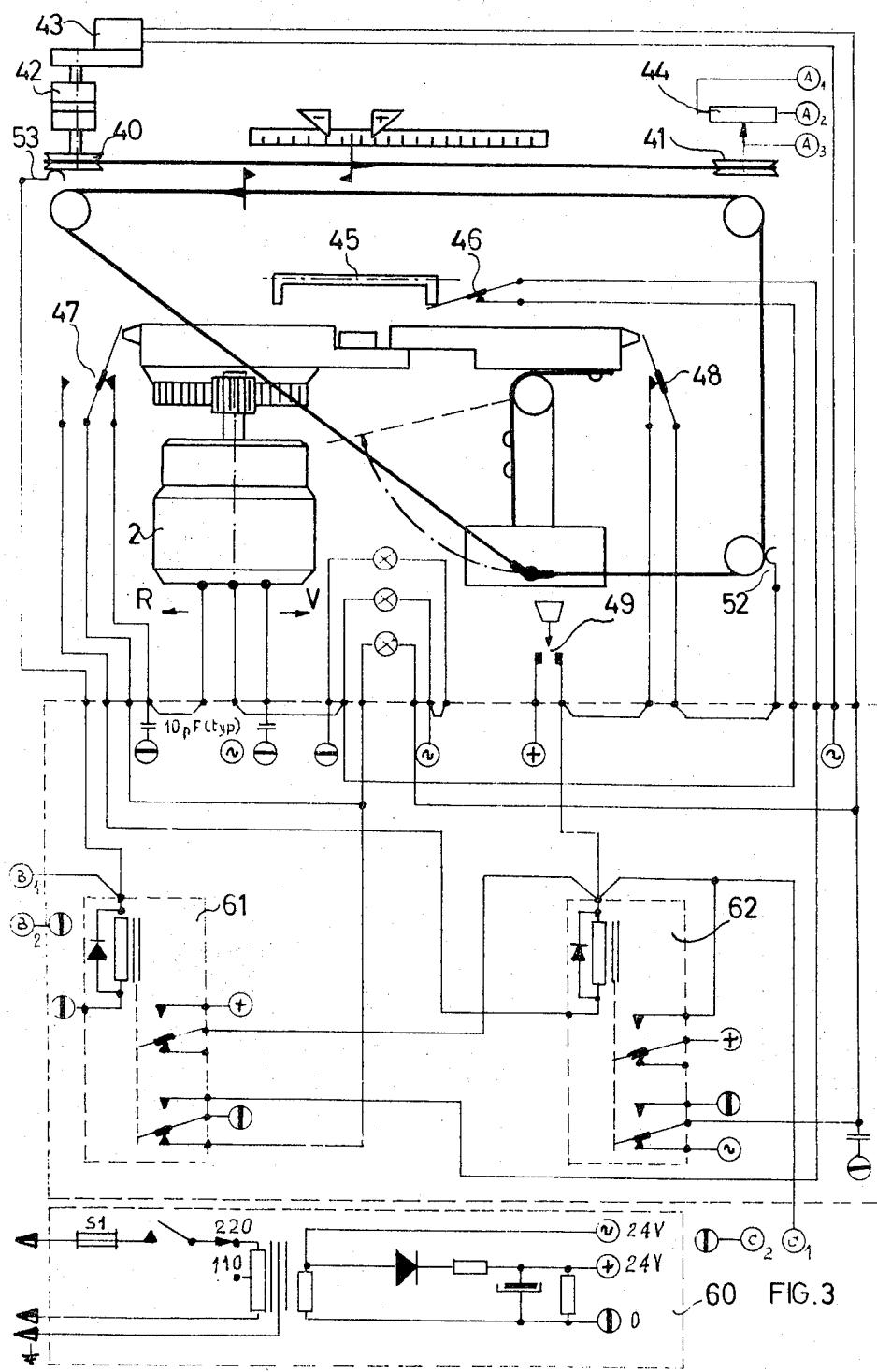
Figure 4:
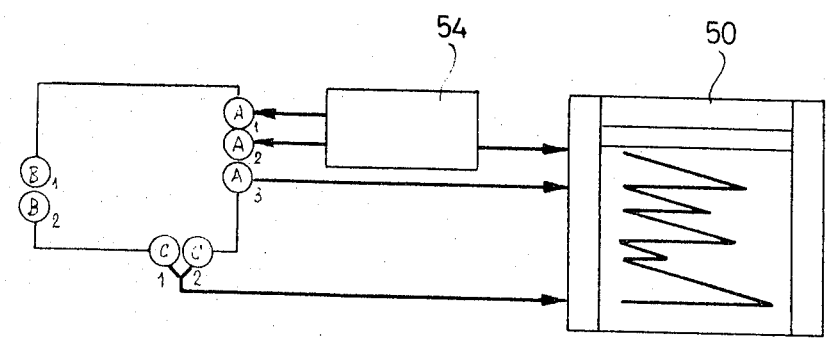
Figure 5:
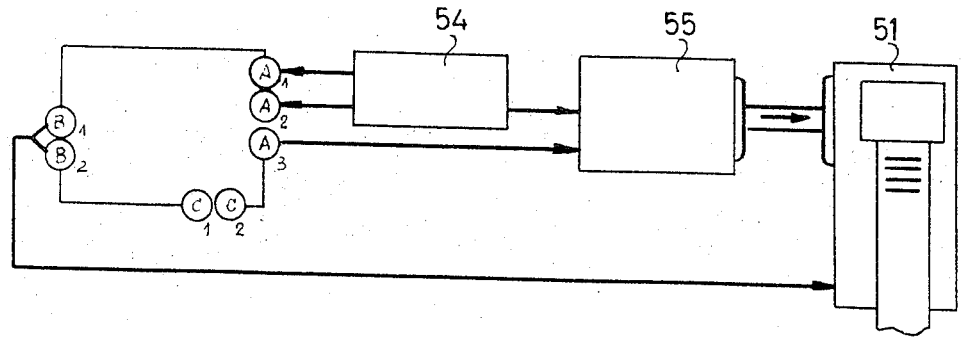

Embodiments of the present invention are now to be described by way of example with reference to the accompanying drawings, in which:

FIG. 1 shows a diagram of a first embodiment;
FIG. 2 shows a diagram of a second embodiment;
FIG. 3 shows a diagram of the electric control circuit connected with the second embodiment;
FIG. 4 shows a block diagram of a recorder connection;
FIG. 5 shows a block diagram of a printer connection.

The tester according to the first embodiment shown in FIG. 1 comprises a pressure slide 1 driven by an electric motor 2 and provided with a tablet support 3. A measuring slide 5 provided with a pendulum weight 4 cooperates with the pressure slide 1, so that a tablet 6 can be clamped between two jaws displaceable relatively to each other, one jaw belonging to the pressure slide 1, the other to the measuring slide 5, with the effect that the tablet is stressed by a diametrically acting force. During this process, the pendulum weight 4 is swung out a fixed pivot D in the direction of the arrow 7. The swinging motion is converted into a linear motion by a cord which is fastened to the pendulum weight and carried around guide rolls 9, 10, 11 with the aid of a spring 12. The cord 8 is fastened to the pendulum weight 4 at point 13.

The representation of the linear motion is effected by an engaging means 14 arranged in the zone between the two guide rolls 10 and 11. A second cord 15 is arranged parallel to the first cord 8 in the zone of the engaging means 14 in the form of a closed loop. This second cord is provided with a drag pointer 16 sweeping the zone of a linear scale 17.

The pressure slide 1 is driven by the motor 2 acting through gearing 18 and an eccentric assembly fitted to the output shaft 19 of the gearing. The eccentric assembly comprises a roll 20 which is eccentric with respect to the output shaft 19 and which engages a groove 21 arranged in the pressure slide 1 at right angles to the movement direction of the slide.

The transmission of the motion from the measuring slide 5 to the pendulum weight 4 is effected by a knife-edge 22 fitted to the measuring slide 5 and by an intermediate piece 23 which engages the said knife-edge and which is connected by a needle bearing 24 to an extension 25 of a pendulum weight support 26. To ensure a uniform rest for the knife-edge, a tension spring 27 is arranged between measuring slide 5 and needle bearing 24. In operation, the force exerted by the pressure slide 1 on the specimen tablet 6 is transmitted by the measuring slide 5 to the pendulum weight 4, so that the latter swings out of its home position in the direction of the arrow 7, against the action of gravity. The cord 8 fastened to the pendulum weight 4 transmits to movement of the pendulum to the drag pointer 16 fastened to the second cord 15. The drag pointer indicates on the linear scale the force acting on the tablet 6. On failure of the tablet, the pendulum weight 4 briefly falls back a certain distance, so that contact with the engaging means 14 and the drag pointer 16 is briefly interrupted. This interruption is utilized, in a manner later to be described, to reverse the gearing 18, so that the pressure slide returns to its home position.

The function of the tension spring 27 arranged between the measuring slide 5 and the journal of the needle bearing 24 is to suppress the play in the system transmitting the force to the pendulum weight 4. For this, the angles of attack of the connecting elements are such that the measuring slide 5 is subjected to a force which is approximately proportional to the delfection angle of the pendulum weight 4.

In the second embodiment shown in FIG. 2, the force-transmitting system includes a steel band 28 which is arranged between the measuring slide 5 and the pendulum weight 4 and which is connected to the pendulum weight support 26 as well as to the measuring slide 5 and interconnects the two parts in a manner free of play. The upper end of the weight support 26 forms a guide surface 29 for the steel band 28. This guide surface has a progressively increasing radius ensuring that the measuring slide 5 is subjected to a force approximately proportional to the deflection angle of the pendulum weight 4.

In contrast with the first embodiment, the drive for the pressure slide 1 is altered. Instead of the eccentric assembly shown in FIG. 1, the second embodiment shown in FIG. 2 is provided with a rack-and-pinion assemlby. This comprises a pinion 30 seated on the output shaft 19 of the gearing 18, and further comprises a rack 31 connected to the pressure slide 1 and meshing with the pinion. As a result, the pressure slide 1 is driven by the motor 2 at a constant speed.

In the second embodiment shown in FIG. 2, the measuring slide 5 is provided with a tablet die 32. Arranged between the tablet die 32 and the measuring slide 5 is an intermediate piece 33 designed to interconnect the two parts. The intermediate piece 33 is axially slidable against the action of a spring in order to ensure that the acceleration forces arising when the tablet 6 strikes the tablet die 32 remain smaller than the static measuring forces.

For better readability, the linear scale 17 in the embodiment shown in FIG. 2 is extended as compared with that in the first embodiment. For the purpose of altering the transmission ratio for the engaging means 14, the guide assembly for the cord 8 is also altered. The pendulum weight 4 is provided with two concentric guide rolls 34 and 35 around which the cord 8 is carried. The ends of the cord are fastened to points 36 and 37 on the base of the tester.

To improve readability yet further, the linear scale 17 is provided with two tolerance markers 38 and 39. These markers are movable along the scale in order to set the desired tolerance limits in each particular case. In a preferred version, the tolerance markers are provided with electronic detectors which respond at the approach of the drag pointer 16. The approach switches may be Hall generators, for instance, provided that the drag pointer 16 is made of magnetic material or is armed with such. The output signals of the Hall generators together with the drag pointer signal arising on failure of the tablet can be converted into signals giving an automatic indication of the tolerance range, such as "below," "within" or "above" the tolerance range.

To reset the drag pointer 16 after a measurement, the second cord 15 carrying the drag pointer is returned around two guide rolls 40 and 41 by a slip clutch 42 connected to one of the guide rolls, e.g., guide roll 40. The slip clutch 42 is driven by a motor 43, whose control will be described later.

The second guide roll 41 for the second cord 15 is connected to the shaft of a resistance potentiometer 44, which serves for the remote transmission of the indication of the drag pointer 16. The details of this transmission system will also be described later.

The electric control of the tester is now to be described with reference to FIG. 3.

A mains supply unit 60 of known type generates a d.c. voltage and an a.c. voltage of 24 volts, for instance. When the mains switch connected to the supply unit is switched on, the mains pilot lamp lights up. At that moment, all the switches and relay contacts are in the positions shown in FIG. 3. A left limit switch 47, operable by the pressure slide 1, connects the terminal R of the motor 2 to the lowest relay contact of an indicator relay 61 which, in the rest position shown, establishes earth connection. As a result, the motor 2 starts and moves the pressure slide 1 to the left until this trips the left limit switch 47, cutting off the current for the motor 2. At the same time, the left limit switch 47 applies the exciter winding of a starting relay 62 to the earth potential. After operation of a starting switch 49, the exciter winding of the starting relay 62 is also connected to the positive voltage. This energizes the starting relay 62 and connects its exciter winding to the positive pole of the voltage source, causing the relay to hold itself. Also, when the starting relay 62 energizes, its lower contact group connects the resetting motor 43 to the voltage and thus starts the return of the drag pointer 16. The two cords 8 and 15 consist of electrically conductive material, such as steel. Thus, the positive voltage applied to the exciter winding of the starting relay 62 is applied across a right limit switch 48, closed at that moment, for the measuring slide 5 and by a sliding contact 52 to the first cord 8. Then, when the drag pointer 16 reaches its zero position, which is defined by striking against the engaging means 14, contact is made with the second cord 15 through the two electrically conductive markers and, through the guide roll 40 and a second sliding contact 53, with the exciter winding of the indicator relay 61.

When the indicator relay 61 energizes, the exciter winding of the starting relay 62 is connected to the positive voltage source and also a contact for the guard cover switch 46 is connected to earth, so that, with the cover closed, a test lamp lights up and the motor 2 is excited at the terminal V. This starts the advance of the pressure slide 1. When this advance has begun, the left limit switch 47 returns to the position shown in FIG. 3, so that the exciter winding of the starting relay 62 loses its earth connection and the relay de-energizes. As a result, the resetting motor 43 is also switched off.

On failure of the tablet, the drag pointer remains in its last position, while the engaging means, propelled by the pendulum weight 4, returns. The interruption of the contact between the engaging means and the drag pointer also involves interruption of the voltage for the exciter winding of the indicator relay 61, so that the latter de-energizes. Consequently, the voltage at the terminal V of the motor 2 is cut off, and the test lamp goes out. Instead, a READ lamp lights up, while the motor 2, fed from the terminal R, runs in reverse and thus returns the pressure slide 1 to its home position regardless of the position of the cover switch 46.

To prevent damage to the appliance, a right limit switch 48 is arranged in the zone of the maximum deflection for the pendulum weight 4; in the embodiment, the limit switch can be tripped by the measuring slide 5. This interrupts the voltage supply to the motor 2 and thus puts a stop to any further movement of pressure slide 1, measuring slide 5 and pendulum weight 4.

As previously mentioned, the guide roll 41 is coupled to a potentiometer 44, presenting the terminals A1, A2 and A3. The positive terminal of the exciter winding for the indicator relay 61 is carried towards outside as output terminal B1, while an output terminal B2 is connected to earth. Another output terminal C1 is connected to the positive terminal of the exciter winding for the starting relay 62, while yet another output terminal C2 is connected to earth.

As shown in FIG. 4, a recorder 50 can be connected to the arrangement according to FIG. 3 in such a manner that a constant voltage source 54 is connected to the terminals A1 and A2, while the reference thereof and the terminal A3 are connected to the measuring inputs of the recorder 50. The paper feed for the recorder 50 is controlled from the terminals C1 and C2.

As shown in FIG. 5, it is possible to connect a printer 51 to the arrangement according to FIG. 3 in such a manner that a constant voltage source 54 is again connected to the terminals A1 and A2, and a reference of the constant voltage source and the terminal A3 are connected across an analogue digital converter 55 to the measuring inputs of the printer 51.

The printing impulse for the printer 51 is taken from the terminals B1 and B2. Instead, of course, it is possible to connect other appliances to the arrangement for the purpose of indicating or recording the measurement values.

I claim:
1. An apparatus for testing the hardness of a tablet, comprising
   1. a pressure slide having a support for the tablet;
   2. a hardness measuring slide associated with the pressure slide and mounted adjacent the tablet support;
   3. an electric motor for driving the pressure slide towards the measuring slide
      a. whereby a tablet on the support is subjected to compressive force between the driven pressure slide and the measuring slide;
   4. a pendulum weight mechanically connected to the measuring slide for movement in response to sliding movement of the measuring slide caused by the driven pressure slide;
   5. a first cord having two ends;
   6. a plurality of guide rolls over which the cord is trained,
      a. two of the guide rolls defining a linearly extending section of the cord intermediate the ends thereof, and
      b. the cord being attached to the pendulum weight for movement of the cord over the guide rolls in response to movement of the pendulum weight;
   7. a second cord having a linearly extending section parallel to the linearly extending section of the first cord;
   8. a drag pointer fastened to the second cord;
   9. a linear scale associated with the drag pointer and indicating the linear position thereof; and
   10. a drag pointer engaging means fastened to the linearly extending section of the first cord, the engaging means engaging the drag pointer upon the movement of the first cord and moving the drag pointer to indicate on the linear scale the compressive force to which the driven pressure slide subjects the table between the slides.

2. The testing apparatus of claim 1, further comprising gear means interposed between the motor and the pressue slide, the gear means being arranged for reversing the pressure slide drive, an electrical control circuit for the electric motor, the drag pointer and the drag pointer engaging means being electrical contacts forming part of the electrical control circuit, and the gear means reversing the drive upon interruption of contact between the drag pointer and the engaging means.

3. The testing apparatus of claim 2, wherein the gear means comprises an output shaft, a driving roll eccentric to the output shaft is carried by the shaft, and the driving roll engages a groove in the pressure slide, the groove extending perpendicularly to the direction of movement of the pressure slide.

4. The testing apparatus of claim 1, wherein the pendulum weight is mechanically connected to the measuring slide by a two-armed lever, one of the lever arms supporting the pendulum weight and the other lever arm extending at an obtuse angle therefrom, and a connecting element between the other lever arm and the measuring slide, a needle bearing affixing one end of the connecting element to the other lever and the connecting element having a knife edge at the other end bearing in a corresponding groove in the measuring slide facing the knife edge, the connecting element extending at an obtuse angle to the other lever arm, the angles of the other lever arm and the connecting element being such that the measuring slide is subjected to a force approximately proportional to the angle of deflection of the pendulum weight; and a tension spring having a respective end thereof attached to the measuring slide and to the needle bearing.

5. The testing apparatus of claim 1, wherein the pendulum weight is mechanically connected to the measuring slide by a two-armed lever, one of the lever arms supporting the pendulum weight and the other lever arm having an arcuate guide surface progressively increasing with an increasing deflection of the pendulum weight, and a connecting steel band between the one lever arm and the measuring slide, one end of the steel band being affixed to the one lever arm and the other steel band end being affixed to the measuring slide, and a section of the steel band intermediate the ends thereof being trained over and supported by the arcuate guide surface.

6. The testing apparatus of claim 1, further comprising gear means interposed between the motor and the pressure slide, the gear means being arranged for reversing the pressure slide drive and having an output shaft, a pinion on the output shaft and coaxial therewith, and a rack meshing with the pinion and affixed to the pressure slide.

7. The testing apparatus of claim 1, further comprising an intermediate pressure element slidably mounted on the measuring slide between the measuring slide and the tablet support of the pressure slide, the intermediate pressure element being slidable in the direction of movement of the pressure slide, and spring means acting upon the intermediate pressure element and biasing the same towards the pressure slide.

8. The testing apparatus of claim 1, wherein the two cord ends are attached to the pendulum weight for movement of the first cord in response to the movement of the pendulum weight.

9. The testing apparatus of claim 1, wherein the pendulum weight carries a pair of coaxial guide rolls over which the respective ends of the first cord are trained, the respective cord ends trained over the coaxial guide rolls being fastened to the apparatus.

10. The testing apparatus of claim 1, further comprising a pair of movable tolerance markers mounted on the linear scale.

11. The testing apparatus of claim 10, wherein the drag pointer comprises a magnetic material, the tolerance markers comprise Hall generators responding to the approach of the drag pointer.

12. The testing apparatus of claim 1, further comprising a pair of guide rolls over which the second cord is trained, a motor for resetting the drag pointer, and a slip clutch mounting the resetting motor on one of the guide rolls for the second cord.

13. The testing apparatus of claim 12, further comprising a potentiometer mounted on the other guide roll for the second cord, the potentiometer indicating the position of the drag pointer in respect of the scale.

14. The testing apparatus of claim 1, further comprising a protective cover mounted over the pressure and measuring slides, and a switch mounted adjacent the protective cover for stopping the electric motor and thus to stop the movement of the pressure slide when the cover is opened.

15. The testing apparatus of claim 1, further comprising an electrical control circuit for the motor, the circuit including the first and second cords, the cords being of electrically conductive material, power transmitting contacts in respective contact with the first and second cords, and the drag pointer and drag pointer engaging means.

16. The testing apparatus of claim 1, further comprising an electrical control circuit for the motor, the circuit including a limit switch adjacent the pressure slide and arranged to be tripped thereby when the pressure slide is in its home position.

* * * * *